(12) United States Patent
Caldwell et al.

(10) Patent No.: US 6,788,774 B1
(45) Date of Patent: Sep. 7, 2004

(54) SYSTEM AND METHOD OF PROVIDING A PER-USE, AUTO-GENERATION, PERSONALIZED WEB PAGE SERVICE

(75) Inventors: Hamish M. Caldwell, Decatur, GA (US); Robert A. Koch, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 556 days.

(21) Appl. No.: 09/863,530

(22) Filed: May 23, 2001

(51) Int. Cl.[7] .............................. H04M 3/42; G06F 15/16
(52) U.S. Cl. ............................. 379/201.03; 379/201.12; 709/201
(58) Field of Search ....................... 379/201.01–201.04, 379/201.11, 201.12, 211.01, 211.02, 229, 230; 370/352; 707/10; 709/201, 203

(56) References Cited

U.S. PATENT DOCUMENTS

| | | | | |
|---|---|---|---|---|
| 5,907,598 A | * | 5/1999 | Mandalia et al. | 379/100.01 |
| 5,978,806 A | * | 11/1999 | Lund | 707/10 |
| 6,282,281 B1 | * | 8/2001 | Low | 379/230 |
| 6,480,484 B2 | * | 11/2002 | Morton | 370/352 |
| 6,658,100 B1 | * | 12/2003 | Lund | 379/201.01 |

* cited by examiner

Primary Examiner—Benny Tieu
(74) Attorney, Agent, or Firm—Kirkpatrick & Lockhart LLP (57) ABSTRACT

A system and method for providing a calling party with an opportunity to generate a web page containing information regarding a communication from the calling party to the called party. The system includes a switch for detecting the communication from the calling party to the called party, and means for communicating a message to the calling party in response to detection of the communication, the message providing the calling party with the option of generating the web page. The system further includes a database, a server in communication with the database for generating the web page based on data in the database, and means for transmitting information regarding the communication to the database when the calling party accepts the option.

26 Claims, 6 Drawing Sheets

SYSTEM AND METHOD OF PROVIDING A PER-USE, AUTO-GENERATION, PERSONALIZED WEB PAGE SERVICE

FIELD OF THE INVENTION

The present invention is directed generally to the field of telecommunications and, more particularly, to Internet-telephony communications.

DESCRIPTION OF THE INVENTION BACKGROUND

For years, consumers have contacted businesses via telephone, oftentimes after accessing the business'phone number from the yellow pages. The caller is typically left with no record of the phone call unless the business is located out of the caller's local calling area, requiring a toll call by the caller, a record of which subsequently appears on the caller's telephone bill. This, however, is the only information about the business contacted that is automatically recorded for the caller. Any other information regarding the phone call would either have to be memorialized by the caller or forever lost.

With the advent and exponential growth of the Internet in recent years, many businesses have established Internet Web sites as a way of gaining greater exposure to consumers. Accordingly, consumers have at their disposal avenues other than telephony through which they may contact businesses. Consumers, through a company's Website, may access information concerning, for example, the business'location (s), history and products/services. In addition, a consumer utilizing the Internet may also contact, and correspond with, the company via electronic mail.

While the telephonic and Internet-based modes of communication described above are well known, no method exists for creating a synergistic relationship between the two media to provide consumers with increased access to businesses. Such a relationship could exploit the best features of each technology and thus be beneficial for both consumers and businesses alike. Businesses would have a better-structured, more continuous exposure to consumers. In turn, callers would have better access to businesses through media synergy.

Thus a need exists for a service that makes available an interface between telephony and the Internet, providing the caller with increased access to businesses and, in turn, giving businesses increased exposure to callers.

SUMMARY OF THE INVENTION

The present invention is directed to a system and method for providing a calling party with an opportunity to generate a web page containing information regarding a communication from the calling party to the called party, such as a business. According to one embodiment, the system includes a switch for detecting the communication from the calling party to the called party and means for communicating a message to the calling party in response to detection of the communication, the message providing the calling party with the option of generating the web page. Where, for example, the calling party is calling from a telephone device having the directory number 404-611-1111, the message may say, "Prior to connecting your call, press '1' if you would like to able to go to 4046111111.abcd.com on the Internet to find additional information provided by the party you are trying to reach. If you wish to be directly connected to the partying you are trying to reach, press '*'."

The system may also include a database and a server in communication with the database for generating the web page based on data in the database, as well as means for transmitting information regarding the communication to the database when the calling party accepts the option. Thus, if the calling party accepts the web page option, information regarding to the call, such as, for example, the calling party directory number, the called party directory number, and the date and time of the call, is transmitted to the database. Thus, the calling party may then access the personalized web page at the URL 4046111111.abcd.com. The web page may include this information, plus additional information provided by the called party, such as URL links to web sites associated with the called party or web coupons.

In addition, to secure privacy of the calling party's web page, the message may prompt the calling party to enter a PIN and/or a user ID. Accordingly, when accessing the personalized web page, the customer would be required to enter the PIN and/or user ID, and the server would include information associated only with the PIN and/or user ID in the web page.

The method, according to one embodiment, includes detecting the communication from the calling party to the called party, communicating a message to the calling party in response to detection of the communication, the message providing the calling party with the option of generating the web page, transmitting information regarding the communication to a database when the calling party accepts the option, and generating the web page based on the information stored in the database.

Accordingly, the present invention provides, consumers with convenient access to additional information associated with their telephone calls. The present invention may also be used to provide a web-based call log for consumers. In addition to these consumer-based benefits, the present invention also provides businesses with another advertising channel. These and other benefits of the present invention will be apparent from the detailed description hereinbelow.

BRIEF DESCRIPTION OF THE FIGURES

For the present disclosure to be clearly understood and readily practiced, the present disclosure will be described in conjunction with the following figures, wherein.

DETAILED DESCRIPTION OF THE EMBODIMENTS OF THE INVENTION

The term "calling party" is used herein generally to refer to the person or unit that initiates a telecommunication. The calling party may also be referred to herein as "caller" or "customer." In some cases, the calling party may not be a person, but may be a device such as a facsimile machine, an answering,service, a modem, etc. The term "called party" is used herein generally to refer to the person or unit that answers or responds to the call or communication. The term "communication" is used herein to include all messages or calls that may be exchanged between a calling party and a called party, including voice, data and video messages. The term "communication" is used synonymously herein with the term "call" unless a distinction is noted.

The present invention, according to one embodiment, is directed to a system and method for per-use auto-generation of a personalized web page via an Internet-telephone interface. According to one embodiment, when a calling party makes a call to a called party, the calling party is provided with an option of creating a personalized web page before being connected to the called party The web page, for example, may be specific to the directory number of the calling party and may provide a call log for the calling party. In addition, as explained further hereinbelow, the web page may allow the called party to provide information to the calling party such as, for example, links to web sites of the called party, advertisements and coupons for the called party, and click-to-message and/or click-to-talk icons that would allow the called party to establish, communications with the called party via the web interface.

According to one embodiment, the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. Before describing further details of the present invention, a description of the AIN is provided.

Figure 1:
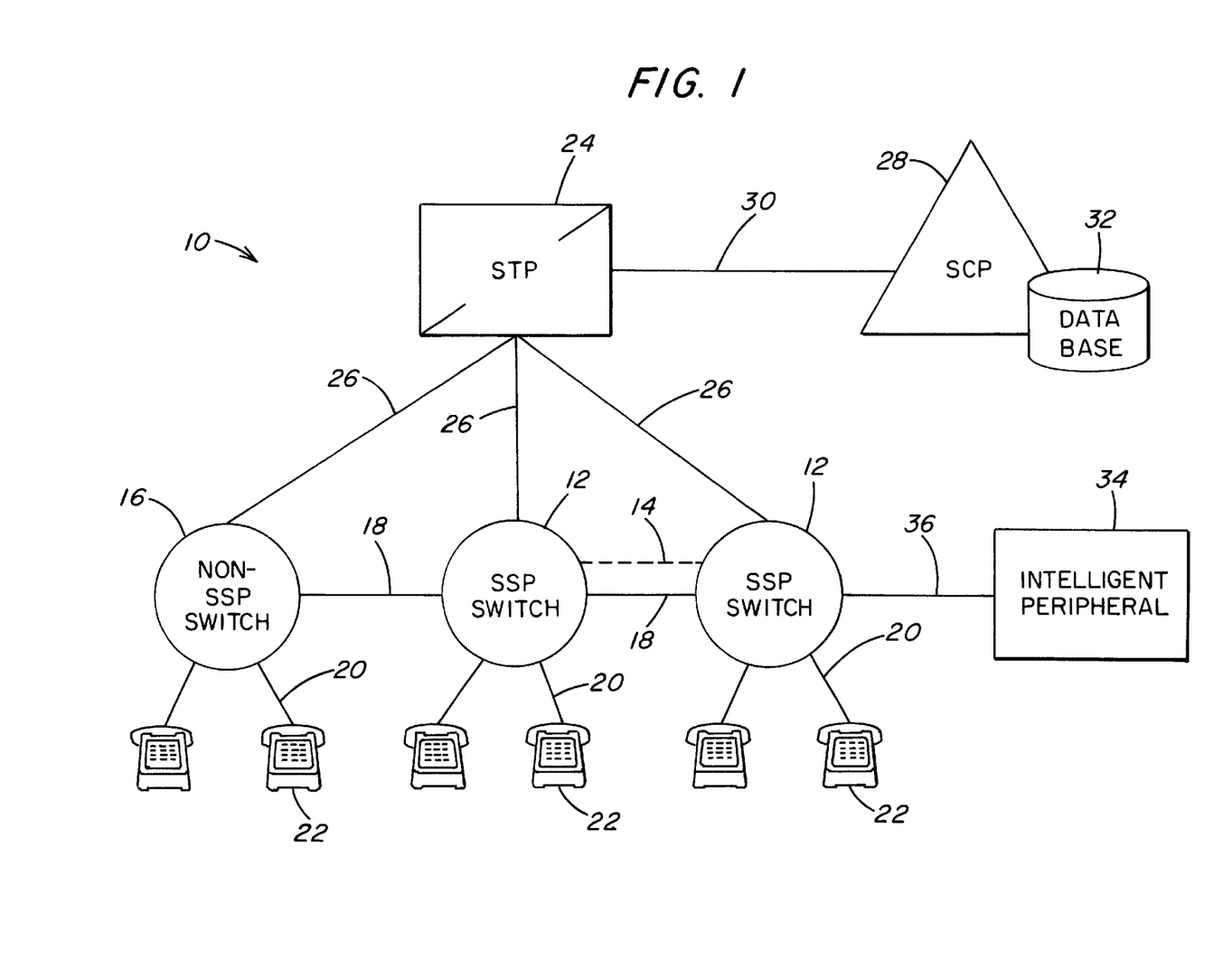
FIG. 1 is a diagram of an Advanced Intelligent Network.

FIG. 1 is a block diagram of an Advanced Intelligent Network (AIN) 10 for integration with the public switched telephone network (PSTN). The AIN 10 may be employed by a Local Exchange Carrier (LEC), and may be utilized by the LEC to allow the LEC to provide call processing features and services that are not embedded within conventional switching circuits of the PSTN.

Atypical LEC includes a number of central office (CO) switches for interconnecting customer premises terminating equipment with the PSTN. For an LEC including the AIN 10 as illustrated in FIG. 1, the central office switches may be provided as Service Switching Points (SSP) switches 12. The dashed line 14 between the SSP switches 12 indicates that the number of SSP switches 12 in the AIN 10 may vary depending on the particular requirements of the AIN 10. The AIN 10 may also include a non-SSP switch 16. The difference between the SSP switches 12 and the non-SSP switch 16 is that the SSP switches 12 provide intelligent network functionality. Interconnecting the SSP switches 12 and the non-SSP switch 16 are communication links 18 which may be, for example, trunk circuits.

Each SSP switch 12 and non-SSP switch 16 has a number of subscriber lines 20 connected thereto. The subscriber lines 20 may be, for example, conventional twisted pair loop circuits connected between the switches 12, 16 and the telephone drops for the customer premises, or the subscriber lines 20 may be trunk circuits, such as T-1 trunk circuits. Typically, the number of subscriber lines 20 connected to each switch 12, 16 is on the order of ten thousand to one hundred thousand lines. Each of the subscriber lines 20 is connected to a terminating piece of customer premises equipment, represented in FIG. 1 by the landline telephones 22. Alternatively, the terminating equipment may be another type of telecommunications unit such as, for example, a telecopier, a personal computer, a modem, or a private branch exchange (PBX) switching system.

For the AIN 10 illustrated in FIG. 1, each SSP switch 12 and the non-SSP switch 16 are connected to a signal transfer point (STP) 24 via a communication link in 26. The communication link 26 may employ, for example, the SS7 switching protocol. The STP 24 may be a multi-port high-speed packet switch that is programmed to respond to the routing information in the appropriate layer of the switching protocol, and route the data packets to their intended destination.

One of the intended destinations of the data packets from the STP 24 is a service control point (SCP) 28. The STP 24 is in communication with the SCP 28 via a communication link 30, which may also employ the SS7 switching protocol. The SCP 28 may be an intelligent database server such as, for example, an Intelligent Network Service Control Point available from Lucent Technologies Inc., Murray Hill, N.J., and may have associated with it a network database 32 for storing network data. The intelligent functionality of the SCP 28 may be realized by application programs, such as programmable Service Program Applications (SPA), which are run by the SCP 28. The SCP 28 is normally employed to implement high volume routing services, such as call forwarding and number portability translation and routing. In addition, another of the functions of the SCP 28 is hosting of the network database 32, which may store subscriber information, such as subscriber call management profiles, used in providing enhanced calling services, such as the simultaneous ring service of the present invention.

The AIN 10 illustrated in FIG. 1 also includes an intelligent peripheral device (IP) 34. The IP 34 may be a services node such as, for example, a Compact Services Node (CSN) available from Lucent Technologies Inc., Murray Hill, N.J., although the IP 34 may be any other type of available AIN-compliant intelligent peripheral device. The IP 34 may be connected to one or more of the SSP switches 12 via a communications link 36 which may be, for example, an Integrated Service Digital Network (ISDN), including BRI (Basic Rate Interface) or PRI (Primary Rate Interface) lines. According to other embodiments, the communications link 36 may be, for example, a T-1 trunk circuit.

The IP 34 may be used primarily when some enhanced feature or service is needed that requires an audio connection to the call such as, for example, the call return and calling name services. Similar to the SCP 28, the intelligent functionality of the IP 34 may be realized by programmable applications executable by the IP 34. In addition, according to one embodiment, the IP 34 does not store any subscriber data necessary for implementing the simultaneous ring service of the present invention such as, for example, the directory number of the subscriber's wireless telephone unit.

In order to keep the processing of data and calls as simple as possible at the switches, such as at the SSP switches 12, a set of triggers may be defined at the SSP switches 12 for each call. A trigger in an AIN is an event associated with a particular subscriber line 20 that generates a data packet to be sent from the SSP switch 12 servicing the particular subscriber line 20 to the SCP 28 via the STP 24. The triggers may be originating triggers for calls originating from the subscriber premises or terminating triggers for calls terminating at the subscriber premises. A trigger causes a message in the form of a query to be sent from the SSP switch 12 to the SCP 28.

The SCP 28 in turn interrogates the database 32 to determine whether some customized call feature or enhanced service should be implemented for the particular call, or whether conventional dial-up telephone service should be provided. The results of the database inquiry are sent back from the SCP 28 to the SSP switch 12 via the STP 24. The return packet includes instructions to the SSP switch 12 as to how to process the call. The instructions may be to take some special action as a result of a customized calling service or enhanced feature. For example, for an enhanced calling feature requiring the capabilities of the IP 34, the return message from the SCP 28 may include instructions for the SSP switch 12 to route the call to the IP 34. In addition, the return message from the SCP 28 may simply be an indication that there is no entry in the database 32 that indicates anything other than conventional telephone service should be provided for the call. The query and return messages may be formatted, for example, according to conventional SS7 TCAP (Transaction Capabilities Application Part) formats. U.S. Pat. No. 5,438,568, which is incorporated herein by reference, discloses additional details regarding the functioning of an AIN.

The AIN 10 illustrated in FIG. 1 includes only one STP 24, one SCP 28, one network database 32, and one IP 34, although the AIN 10 may further include an additional number of these components as well as other network components, which not are included in FIG. 1 for purposes of clarity. For example, the AIN 10 may additionally include redundant SCPs and STPs to take over if the STP 24 or the SCP 28 should fail. In addition, the AIN 10 may include an Automatic Electronic Switching System (AESS) Network Access Point (NAP) in communication with the STP 24, which may be programmed to detect the trigger conditions. Further, the AIN 10 may include regional STPs and regional SCPs in communication with, for example, the local STP 24, for routing and servicing calls between different LECs.

Figure 2:
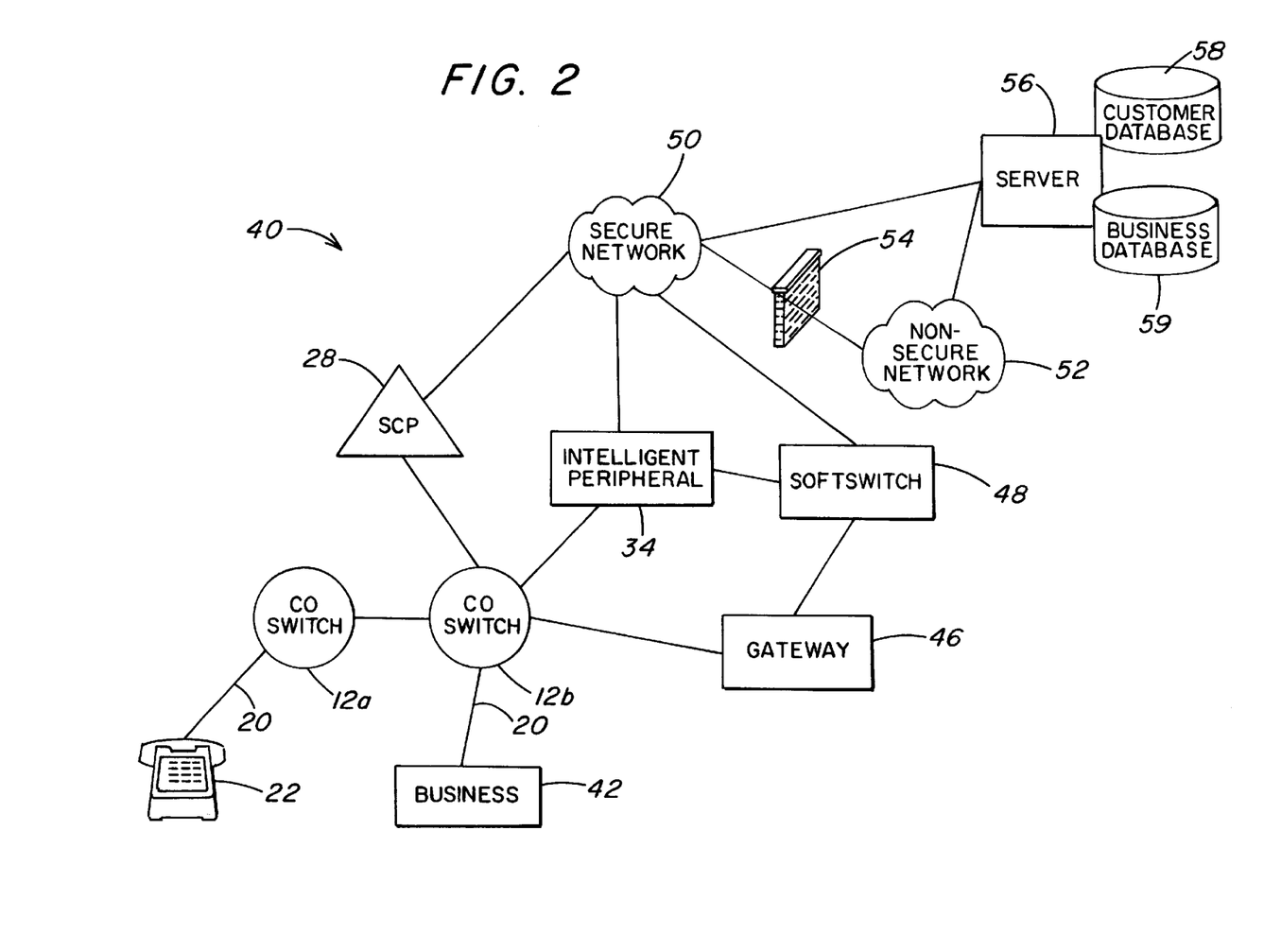
FIG. 2 is a diagram of a system according to one embodiment of the present invention.

FIG. 2 is a diagram illustrating a system 40 according to one embodiment of the phone-web page service of the present invention. The system 40 includes portions of the AIN described in conjunction with FIG. 1, including SSP switches 12a–b (designated as "CO SWITCH" in FIG. 2), the SCP 28, and the IP 34.

For purposes of describing features of the present invention, the calling party is a user of the telephone 22, and the called party is a business 42 in communication with the CO switch 12b. It should be noted that the calling party might use a device other than a landline telephone as illustrated in FIG. 2 such as, for example, a wireless telephone or any other device capable of initiating telephone communications. In addition, the called party 42 may be any device or system capable of receiving telephone communications.

Also as illustrated in FIG. 2, the system 40 may include a gateway, 46 and a softswitch 48 in communication with components of the AIN, including, for example, the IP 34 and/or the CO switch 12b. The gateway 46, may be, for example, an SS7/IP gateway for performing protocol conversions between the SS7 and IP (Internet Protocol) protocols. The softswitch 48 may be a programmable network switch that can process all types of packet protocols. Where the calling party is calling from a VoIP device, the softswitch 48 may be used to direct the call via the gateway 46 to the CO switch 12b for the business 42. In addition, according to other embodiments of the invention, either of the CO switches 12a–b may instead by a softswitch, although embodiments of the present invention will be described hereinafter as if the switch in communication with telephone device 22 and the business 42 are CO switches.

The system 40 may also include a secure network 50 in communication with the SCP 28 of the AIN 10. The secure network 50 may be a secure IP network such as, for example, a secure intranet. The secure network 50 may be in communication with a non-secure network 52. The non-secure network 52 may be a non-secure IP network such as, for example, the Internet. To maintain the security of the secure, network 50, a firewall 54 may be provided between the secure network 50 and the non-secure network 52.

The system 40 may also include a server 56 and associated databases 58, 59. The database 58 may store customer related data, such as data pertaining to a user of the telephone 22, and the database 59 may store data pertaining to the business 42, as described further below. The server 56 may be any type of server capable of constructing web pages from data in the databases 58, 59 for viewing at a remote browser device via either or both of the networks 50, 52, as described further hereinbelow.

According to one embodiment, after obtaining the directory number for the business 42, a caller, using the telephone 22, may initiate a telephone call to the business 42. An advertisement for the business 42 in a telephone directory may provide a reference to the availability of the telephony-Internet interface of the present, invention, which may be provided to anyone calling that business 42. The telephone directory reference may be made available to the business 42 for a fee.

In response to the call to the business 42, a terminating event, such as a TAT trigger at the CO switch 12b, may be detected, prompting the CO switch 12b to send, for example, a TCAP message to the SCP 28. In response to the message, the SCP 28 may interrogate its associated database 32 (see FIG. 1) regarding the called number (i.e., the directory number for the business 42). The database 32 may indicate that the called number is associated with the personalized web page service of the present invention. In response thereto, the SCP 28 may send a return message to the CO switch 12b to route the call the IP 34.

The IP 34 may then play an announcement for the calling party providing the calling party with the option of creating a personalized web page containing information provided by the called party (e.g., the business 42). According to one embodiment, the URL for the personalized web page for the calling party may be specific to the directory number of the calling party ("calling DN"). For example, if the directory number for the telephone 22 in FIG. 2 is 404-611-1111, the announcement may be: "Prior to connecting your call, press '1' if you would like to able to go to 4046111111.abcd.com on the Internet to find additional information provided by the party you are trying to reach. If you wish to be directly connected to the party you are trying to reach, press '*'." The calling party may access the URL for the personalized web page as described further hereinbelow.

The IP 34 may play the announcement using, for example, a text-to-speech (TTS) application or a recorded voice file. The announcement may reference the called party generically (e.g., "the party you are trying to reach") or, according to another embodiment, may reference the called party specifically by name (e.g., "Business XYZ"). Information regarding to the called party may be stored at the IP 34. As mentioned previously, the announcement may instruct the caller to exercise or decline the option of creating a personalized web page by pressing a particular key or sequence of keys on a touch-tone telephone 22. The calling party's response to the announcement may thus be determined using a dual-tone multifrequency (DTMF) at decoder at the IP 34. In addition, the IP 34 may determine the calling party's response to the announcement using an Automatic Speech Recognition (ASR) module.

According to other embodiments, the announcement may additionally allow the caller to create a personal identification number (PIN) to thereby secure the privacy of the information contained in the personalized web page. Upon repeat usage, the process can be modified so that the calling party, at its option, may either press a key to use its existing PIN, enter a new PIN, or choose to ignore the personalized web page option. By electing to use an existing PIN, the caller may add information about that call to his/her already-existing personalized web page. Likewise, an individual caller may utilize different PINs to create separate web pages for business and personal calls, for example. In addition, the announcement may allow the calling party to enter a user ID via the DTMF interface. The user ID may allow multiple users to access separate personalized web pages associated with a single calling DN.

According to another embodiments of the present invention, the CO switch 12b may play the announcement using, for example, a recorded voice file. According to another embodiment, the SCP 28 may instruct the CO switch 12b to route the call to the softswitch 48, via the gateway 46, for playing of the announcement. The softswitch 48 may be in communication with the IP 34 via, for example, an ISDN communication link, thereby allowing the softswitch 48 to use the IP 34 as a media resource for playing announcements.

Upon the caller's election to generate a personalized web page in response to the announcement, information personal: to the calling party may be sent to the customer database 58 via the secure network 50 and/or the non-secure network 52. The personalized information may include the date and time of the call to the business 42, the directory numbers for the calling party 22 and the called party 42 (the calling DN and the called DN), and the PIN. Thereafter, the calling party 22 may be connected to the business 42 for completion of the call. On the other hand, if the calling party chooses to ignore the personalized web page option, the call may be directed to the business 42.

Figure 3:
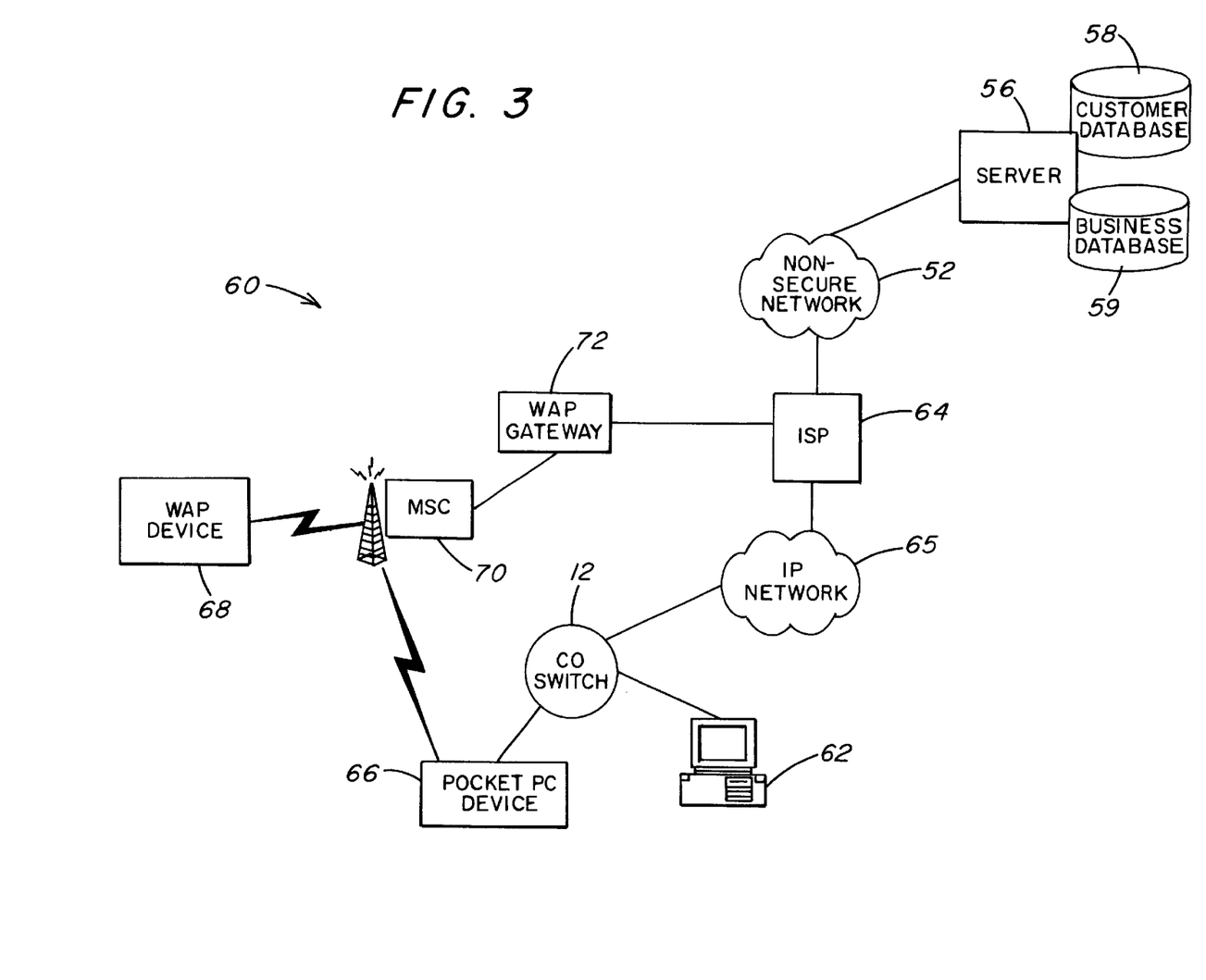
FIG. 3 is a diagram of a system according to another embodiment of the present invention.

FIG. 3 is a diagram of a network 60 through which a customer may access his personalized web page. As illustrated in FIG. 3,the customer may access the server 56 via the non-secure network 52 from, for example, a personal computer (PC) 62, by entering the URL for the personalized web page. The PC 62 may be connected to the non-secure network 52 through an Internet Service Provider (ISP) 64. As illustrated in FIG. 3, the PC 62 may be in communication with the ISP 64 through, for example, a CO switch 12 and an IP network 65.

Figure 4:
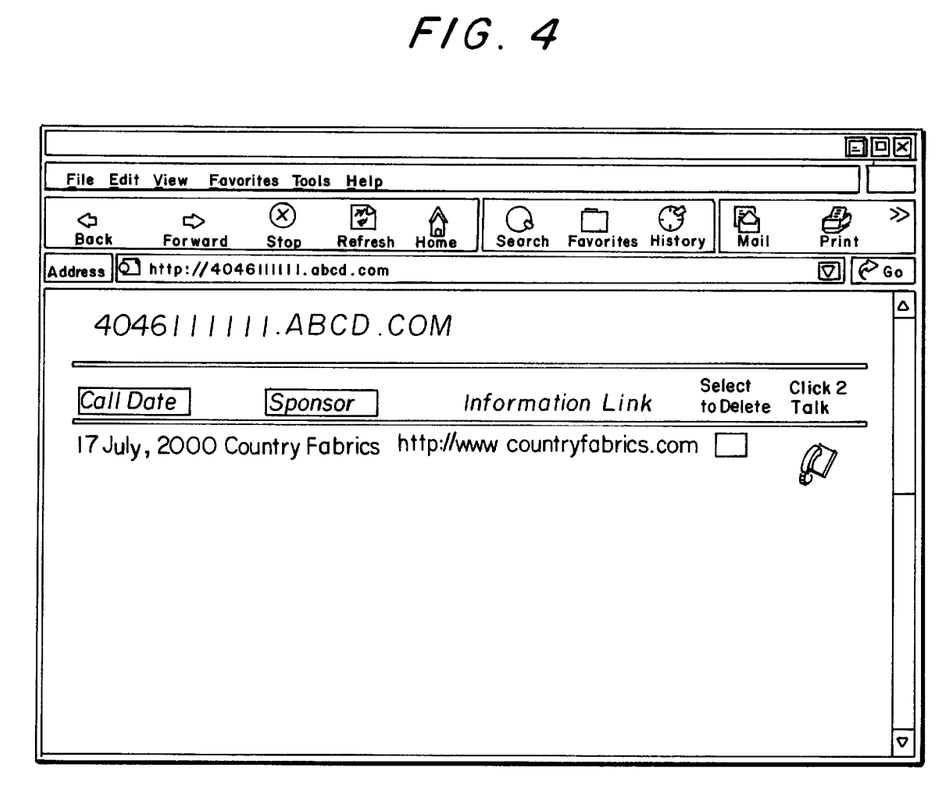
FIG. 4 is a screen shot of a personalized web page according to one embodiment of the present invention.

Using the previous example, the URL may be 4046111111.abcd.com. When the customer enters this URL from the PC 62, the server 56 may construct the customer's personalized web page from the data in the customer database. The PC user may then view the web page using, for example, a browser. As discussed previously, the customer database may include entries for the data and time of the call to the business 42, the calling DN and the called DN, the PIN, and/or the user ID. In addition, server 56 may map data stored in the business database 59 with the called DN. This information may also be displayed on the customer's personalized web page For example, the information stored in the business database 59 may be, for example, the URL for the business's web site. Accordingly, the customer's personalized web page may include a link to the business's web site. FIG. 4 is a screen shot of the personalized web page according to one embodiment of the present invention where the called party was Country Fabrics, and the called was placed on Jul. 17, 2000.

It should be recognized that usage of a PIN allows a customer to create, and is hence access, several different personalized web pages. That is, upon accessing the URL, the customer may be requested to enter a PIN. Based on the entered PIN, the server 56 may then retrieve the data from the customer database 58 associated with the PIN.

In addition, usage of the user ID may allow several customers to access personalized web pages associated with a particular calling DN. For example, upon entering the URL, the customer may be requested to enter a user ID. Based on the entered user ID, the server 56 may then retrieve the data from the customer database 58 associated with the user ID. According to one embodiment, the system 40 may include a database (not shown) for PIN and user ID verification. According to one embodiment, the PIN/user ID database may be a database associated with the SCP 28, the CO switch 12b, or the IP 34. According to another embodiment, the PIN/user ID database may be an LDAP database in communication with the IP networks 50, 52.

Returning to FIG. 3, a customer may access the personalized web page from any device capable of viewing web pages including for example, a pocket PC device 66 (also sometimes called a "palmtop PC"), such as a Hewlett-Packard Jornada® with a Microsoft Windows® operating system. In addition, other devices that may be used to access the personalized web page include a personal digital assistant (PDA) (not shown), an interactive pager (not shown), and a wireless application protocol (WAP) device 68. The WAP device 68 may be connected to the non-secure network 52, and hence the server 56, via a mobile switching center (MSC) 70 and a WAP gateway 72. The server 56 may modify the content of the web page based on the type of device accessing the web page. As illustrated in FIG. 3, other types of devices including, for example, the pocket PC device 66 may access the web page through a wireless front-end interface.

Figure 5:
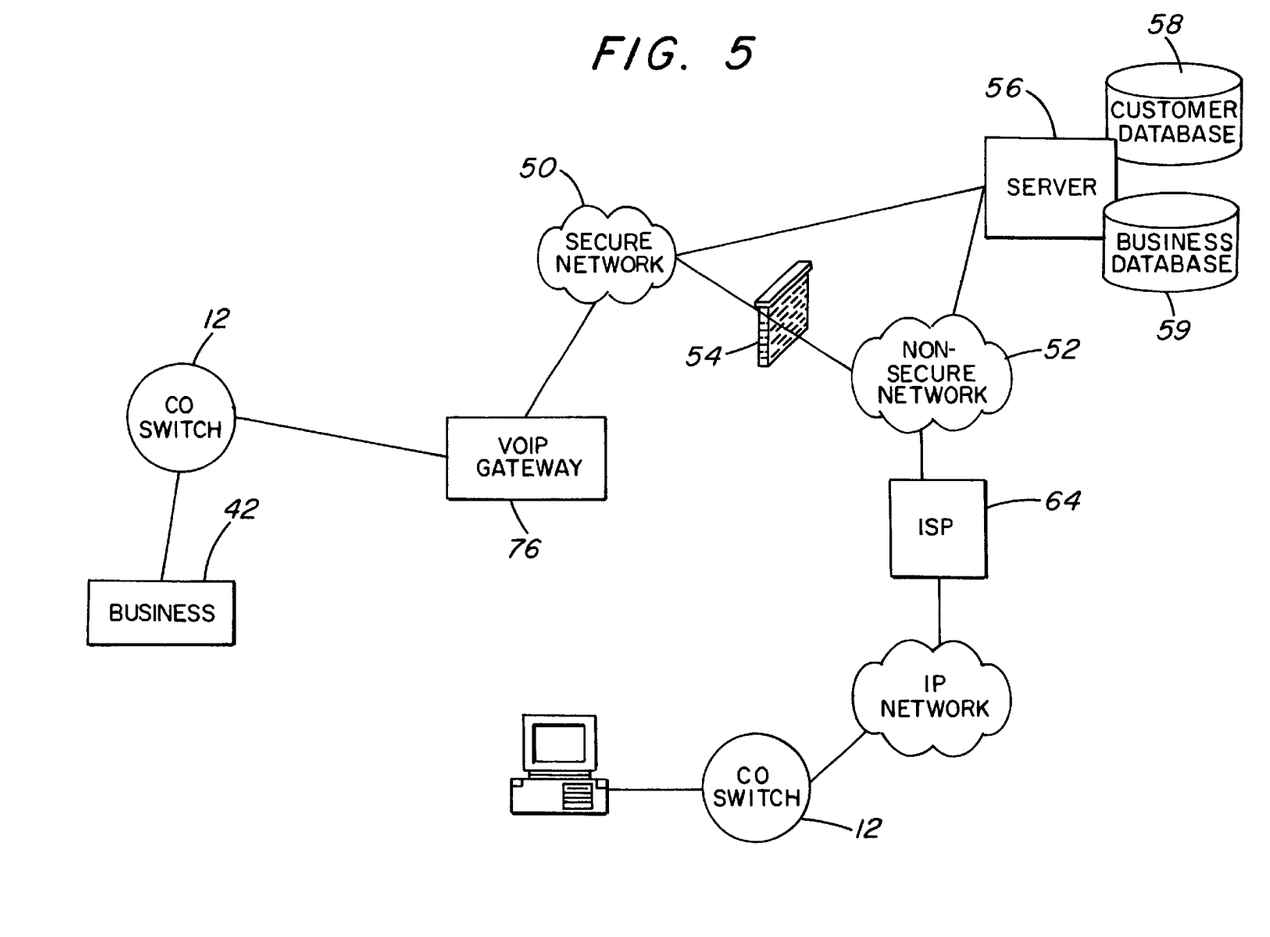
FIGS. 5 and 6 are diagrams of the system according to other embodiments of the present invention.

As illustrated in FIG. 4, the server 56 may include in the customer's web page a "click-to-talk" icon for each call entry. By clicking on the "click-to-talk" icon, the customer may, for example, initiate a voice-over-IP (VoIP) phone call between the customer's PC 62 and the business 60, as illustrated in FIG. 5. According to such an embodiment, the business 60 may establish a VoIP connection with the customer PC 62 via a VoIP gateway 76 connecting the business 42 to the IP networks 50, 52. According to another embodiment, activation of the click-to-talk option may send a signal to the SCP 28 via the networks 50, 52 that may cause the CO switch 12b to establish a PSTN connection between the calling party and the business 42.

According to another embodiment, the customer's personalized web page may include a "click-to-message" icon (not shown) that would initiate, upon activation by the customer, for example, an e-mail or instant messaging link between the customer's PC 62 and the business 42 via the IP networks 50, 52. In addition, as illustrated in FIG. 4, individual entries on the web page may be selected for deletion.

According to another embodiment, the business database 59 may also have associated with the called DN information pertaining to, for example, the general industry of the business 42. When generating the customer's personalized web page, the server 56 could thus include this information as well, such as URL links for information about the industry in general. For example, if the caller was calling a clothing store, the generated web page could provide information about several different clothing stores. Rather than charging the caller a fee, each business providing information may be charged for the advertising space.

The personalized web page may also provide links to additional features, such as a notes/memo data entry window, essentially allowing the caller to use the personalized web page as a contact manager and/or reminder service.

The personalized web page may also provide a cumulative list of all the calls the caller has made to called parties. According to one embodiment, this on-line call log service may be provided to the customer for a fee.

Figure 6:
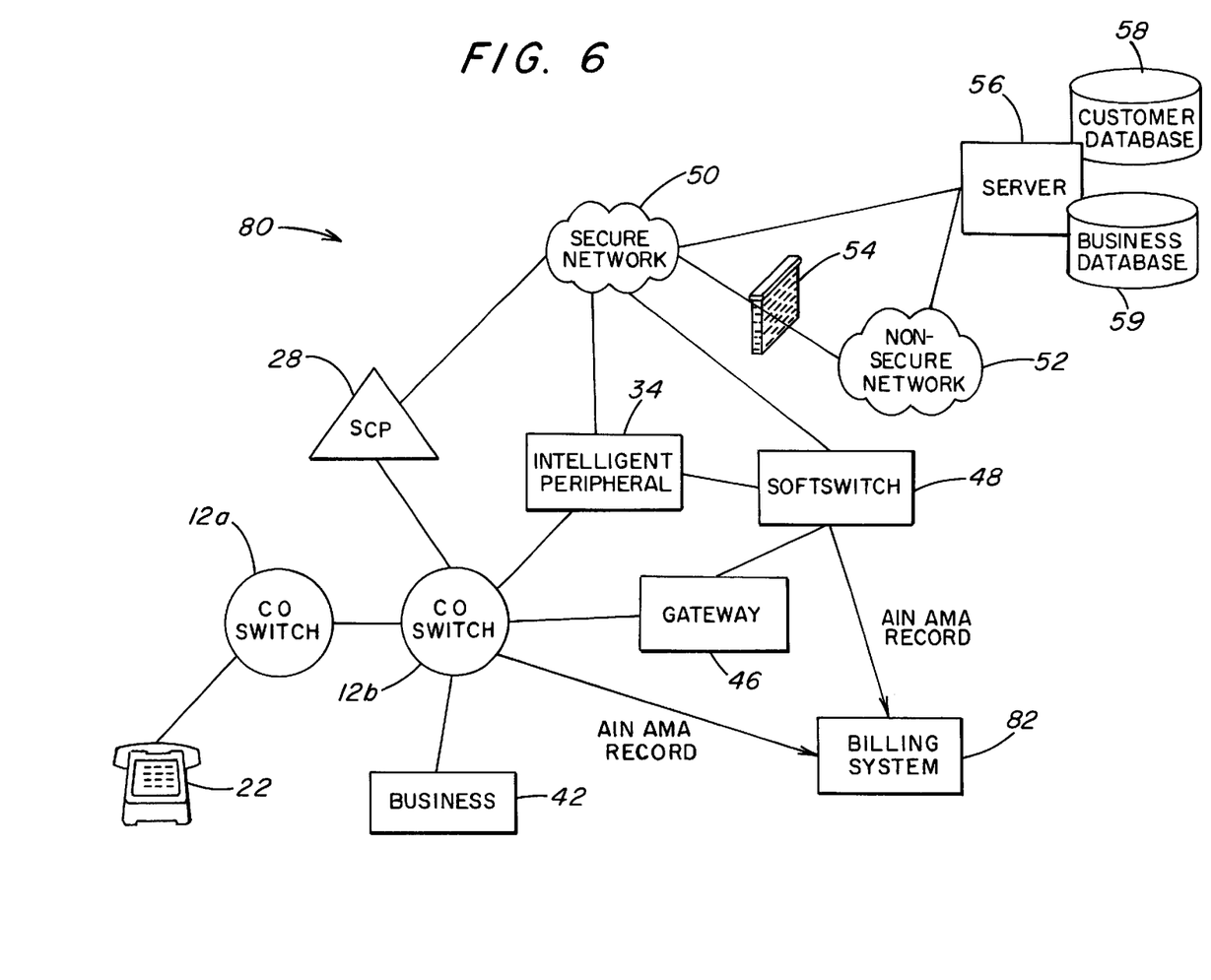

According to another embodiment, the calling party may be charged for creating the personalized web page. FIG. 6 is a diagram of a system 80 according to such an embodiment. The system 80 includes a billing system 82 in communication with, for example, the CO switch 12b and/or the softswitch 48. Upon acceptance by the calling party of the personalized web page option, the CO switch 12b or the softswitch 48 may create and send an AIN AMA (automatic message accounting) record to the billing system 82. The billing system 82 may then bill the calling party based on the AIN AMA record. When presented with the opportunity of creating a personalized web page, the caller could be informed that to do so would involve an additional charge to appear automatically on the phone bill associated with the calling DN used to initiate the call.

According to another embodiment of the present invention, the called party, such go as the business 42, may access its entries in a customer's personalized web page to provide more particularized information for the customer. According to one embodiment, the business 42 is provided with the calling DN from the AIN as with conventional called ID services, and has password access only to the customer database 58 to thereby prevent other parties from corrupting the data. In addition, it should be noted that the business 42 should not be permitted to change other entries in the customer database 59 that do not pertain to its business.

With this capability, called parties may modify the content of the personalized web page of the caller. For example, the called party (e.g., business 42) may provide a link to a web site that is relevant to the purpose of the calling party's call. Byway of another example, the business 42 could provide a link to a web coupon for the calling party. These coupons may be customized based upon the content of each specific call or upon attributes derived from a caller-specific network-based profile. This ability may be provided to businesses for a fee.

It is to be understood that the present description illustrates those aspects of the invention relevant to a clear understanding of the invention. Certain aspects of the invention that would be apparent to those of ordinary skill in the art and that, therefore, would not facilitate a better understanding of the invention, have not been presented in order to simplify the present description. Although the present invention has been described in connection with certain embodiments, those of ordinary skill in the art will, upon considering the foregoing description, recognize that many modifications and variations of the invention may be employed. It is intended that all such variations and modifications of the inventions are covered by the foregoing description and following claims.

What is claimed is:

1. A system for providing a calling party with an opportunity to generate a personalized calling party web page containing information regarding a communication from the calling party to a called party, comprising:

a switch for detecting the communication from the calling party to the called party;

means for communicating a message to the calling party in response to detection of the communication, the message providing the calling party with an option of generating the personalized calling party web page;

a database;

a server in communication with the database for generating the personalized calling party web page based on data in the database; and means for transmitting information regarding the communication to the database when the calling party accepts the option.

2. The system of claim 1, wherein the means for transmitting information includes means for transmitting a calling party directory number and a called party directory number to the database.

3. The system of claim 1, wherein the means for communicating the message to the calling party includes an intelligent peripheral in communication with the switch.

4. The system of claim 1, wherein the means for communicating the message to the calling party includes the switch.

5. The system of claim 1, wherein the means for communicating the message to the calling party includes a softswitch in communication with the switch.

6. The system of claim 1, wherein the switch is selected from the group consisting of a central office switch and a softswitch.

7. The system of claim 1, wherein the means for transmitting the information to the database includes an intelligent peripheral in communication with the switch.

8. The system of claim 7, wherein the means for transmitting the information to the database includes a secure network in communication with the intelligent peripheral.

9. The system of claim 8, wherein the means for transmitting the information to the database includes a non-secure network in communication with the intelligent peripheral.

10. The system of claim 1, further comprising means for routing the communication to the called party.

11. The system of claim 10, wherein the means for routing the communication to the called party includes:

means for routing the communication to the called party when the calling party rejects the option; and means for routing the communication to the called party after the calling party accepts the option.

12. The system of claim 10, wherein the means for routing the communication to the called party includes the switch.

13. The system of claim 10, wherein the means for routing the communication to the called party includes an intelligent peripheral in communication with the switch.

14. The system of claim 10, wherein the means for routing the communication to the called party includes a softswitch in communication with the switch.

15. A system for providing a calling party with an opportunity to generate a personalized calling party web page containing information regarding a communication from the calling party to a called party, comprising:

a switch for detecting the communication from the calling party to the called party;

means for communicating a message to the calling party in response to detection of the communication, the message providing the calling party with an option of generating the personalized calling party web page;

a first database;

a second database for storing information regarding the called party;

a server in communication with the first and second databases for generating the personalized calling party web page based on information stored in the first and second databases; and means for transmitting information regarding the communication to the first database when the calling party accepts the option.

16. A method for providing a calling party with an opportunity to generate a personalized calling party web page containing information regarding a communication from the calling party to a called party, comprising:

detecting the communication from the calling party to the called party;

communicating a message to the calling party in response to detection of the communication, the message providing the calling party with an option of generating the personalized calling party web page;

transmitting information regarding the communication to a database when the calling party accepts the option; and generating the personalized calling party web page based on information stored in the database.

17. The method of claim 16, further comprising charging the calling party a fee for accepting the option.

18. The method of claim 16, further comprising storing information regarding the called party in a second database, wherein generating the personalized calling party web page includes generating the personalized calling party web page based on information stored in the first and second databases.

19. The method of claim 16, further comprising charging the called party a fee when the personalized calling party web page includes information provided by the called party.

20. The method of claim 16, further comprising publishing a directory number associated with the called party.

21. The method of claim 20, further comprising charging the called party a fee for publishing the directory number.

22. The method of claim 16, further comprising routing the communication to the called party when the calling party rejects the option.

23. The method of claim 16, further comprising routing the communication to the called party after the calling party accepts the option.

24. The method of claim 16, wherein:

transmitting information to the database includes transmitting at least one of a calling party directory number, a called party directory number, and a PIN associated with the calling party.

25. The method of claim 24, wherein transmitting information to the database further includes transmitting a time of the communication.

26. The method of claim 24, wherein:

transmitting information to the database includes transmitting a user ID associated with the calling party.

* * * * *